United States Patent
Weber et al.

(10) Patent No.: US 10,781,071 B2
(45) Date of Patent: Sep. 22, 2020

(54) PROTECTIVE INSERT

(71) Applicant: Lamiflex AB, Nykoping (SE)

(72) Inventors: Janni Weber, Gavle (SE); Fredrik Rosenlind, Nykoping (SE); Fred Ahlund, Nykoping (SE)

(73) Assignee: Lamiflex AB (SE)

( * ) Notice: Subject to any disclaimer, the term of this patent is extended or adjusted under 35 U.S.C. 154(b) by 76 days.

(21) Appl. No.: 16/262,520

(22) Filed: Jan. 30, 2019

(65) Prior Publication Data

US 2019/0218057 A1    Jul. 18, 2019

Related U.S. Application Data

(63) Continuation of application No. 12/811,324, filed as application No. PCT/SE2009/050194 on Feb. 20, 2009, now abandoned.

(30) Foreign Application Priority Data

Feb. 22, 2008    (SE) ...................................... 0800425

(51) Int. Cl.
B65H 75/18 (2006.01)
B23P 19/00 (2006.01)

(52) U.S. Cl.
CPC ............ B65H 75/185 (2013.01); B23P 19/00 (2013.01); *Y10T 29/49826* (2015.01)

(58) Field of Classification Search
USPC ............... 206/413, 414, 415, 416, 397, 389; 242/571, 577, 577.1
See application file for complete search history.

(56) References Cited

U.S. PATENT DOCUMENTS

| | | |
|---|---|---|
| 2,093,231 A | 6/1935 | Broadwell |
| 3,065,680 A | 9/1957 | Weidman, Sr. |
| 3,144,695 A | 8/1964 | Budwig |
| 3,203,453 A | 8/1965 | McConnell |
| 3,239,988 A | 3/1966 | Meyer |
| 3,354,597 A | 11/1967 | Meyer |
| 3,379,465 A | 4/1968 | Alain |
| 3,396,918 A | 8/1968 | Adamson |
| 3,445,979 A | 5/1969 | Meyer |
| 3,540,085 A | 11/1970 | Berning |
| 3,605,200 A | 9/1971 | Vallinotto et al. |
| 3,636,593 A | 1/1972 | Buttriss et al. |
| 3,765,694 A | 10/1973 | Allsop |
| 4,053,120 A | 10/1977 | Frantzreb, Sr. |
| 4,197,688 A | 4/1980 | Mauer |
| 4,372,011 A | 2/1983 | Aranyos |

(Continued)

FOREIGN PATENT DOCUMENTS

| | | |
|---|---|---|
| GB | 2337975 A | 12/1999 |
| WO | 9846502 A1 | 6/2010 |

*Primary Examiner* — Jacob K Ackun
(74) *Attorney, Agent, or Firm* — Holland & Hart, LLP

(57) ABSTRACT

A protective insert for protecting e.g. coils or rolls of sheet steel or aluminum is disclosed. The protective insert is open and diametrically adjustable. The ends of the protective insert may be adjustably engaged by means of engagement means. The engagement means permit diametrical adjustment and locking of the diameter of the protective insert to a suitable diameter. A method of protecting a portion of an object, in particular a roll of sheet material, having a hollow core, is also disclosed.

20 Claims, 8 Drawing Sheets

(56) References Cited

U.S. PATENT DOCUMENTS

| | | | |
|---|---|---|---|
| 4,516,892 A | | 5/1985 | Curro, Jr. |
| 4,557,024 A | | 12/1985 | Roberts |
| 4,800,699 A | | 1/1989 | Lang |
| 5,480,106 A | | 1/1996 | Voissem |
| 5,651,224 A | | 7/1997 | Brabant |
| 5,660,277 A | | 8/1997 | Bostic |
| 5,904,315 A | * | 5/1999 | McInerney ............ B65H 75/24 242/571 |
| 5,904,329 A | * | 5/1999 | Kanome .............. B65D 85/672 248/201 |
| 5,961,063 A | | 10/1999 | Parry |
| 6,460,796 B1 | | 10/2002 | Berning |
| 6,619,581 B2 | | 9/2003 | Liu |
| 6,783,833 B2 | | 8/2004 | Bordner et al. |
| 7,364,440 B2 | | 4/2008 | Gobron |
| 7,364,442 B2 | | 4/2008 | Bang |
| 8,505,794 B2 | | 8/2013 | Ardigo |
| 2008/0135672 A1 | * | 6/2008 | Fabian .................. B65H 75/10 242/571 |
| 2013/0270138 A1 | | 10/2013 | Weber et al. |
| 2014/0275803 A1 | | 9/2014 | Cushner |

* cited by examiner

SECTION D-D

SECTION C-C

SECTION B-B

SECTION A-A

PROTECTIVE INSERT

RELATED APPLICATIONS

This application is a continuation of U.S. patent Ser. No. 12/811,324, which was filed on Jun. 3, 2013 and titled "Protective Insert." U.S. patent Ser. No. 12/811,324 claims priority to WIPO No. 2009/010528 (PCT/SE2009/050194) which has an international filing date of Feb. 20, 2009 and is titled "Protective Insert." WIPO No. 2009/010528 claims priority to SE No. 0800425-1 which was filed on Feb. 22, 2008.

TECHNICAL FIELD

The present invention relates to a protective insert or cover, more particularly to a protective insert or cover for fitting into the hollow or open core of a hollow or open cored object, e.g. an open or hollow cored roll or coil of sheet material. The invention also relates to a method of protecting the annular end surface and the inner cylindrical surface of such an object from damage.

BACKGROUND

It is known to protect hollow or open cored substantially cylinder shaped objects, e.g. rolls of sheet steel, sheet aluminum or paper, by mounting a protective item in the center aperture or eye of the object. However, solutions known from the background art have several drawbacks. The inner diameter of a roll of e.g. sheet steel or aluminum may vary from its nominal diameter. One common inner diameter is e.g. 610 mm but rolls having this nominal inner diameter may have an inner diameter in the interval of approximately 580-615 mm. In the background art there are known open or closed, ring shaped protective items of plastic or steel to be mounted in the eye of a roll of sheet steel or aluminum. The protective items made of steel are heavy and often have sharp edges which may damage the roll and/or worker and it is often difficult to securely fasten them. The protective items made of plastic are also often difficult to securely fasten. One drawback with background art solutions is that they are not adjustable to different inner diameters in a simple and efficient manner. Another drawback is that the mounting often is cumbersome.

Background art solutions are e.g. known from WO-A1-98/46502, GB-A-2 337 975 and U.S. Pat. No. 6,783,833B2.

It is an aim to provide an improved device and method that obviates or at least reduces some or all of the drawbacks connected with the background art.

SUMMARY

It is an object of the present invention to address the problems outlined above. This object and others may be obtained by providing a device and a method according to the independent claims attached below.

According to a general form of the invention there is provided a protective insert for protecting a portion of an object having a hollow core. Said protective insert comprises a sleeve and a flange, said flange extending radially outwards from the circumference of said sleeve. Said protective insert has engagement means and is diametrically adjustable and said sleeve and said flange are open. That the sleeve and the flange are open means that each of the flange and the sleeve has two ends and that there are adjacent sleeve and flange portions. In the protective insert;

a first flange portion and a second flange portion, or
a first sleeve portion and a second sleeve portion, comprise first engagement means for adjustably engaging;
said first flange portion and said second flange portion, or said first sleeve portion and said second sleeve portion.

The protective insert may optionally have the following further characteristics.

According to one advantageous embodiment, there is provided a protective insert wherein said first engagement means comprises a slot and a pin, said slot and said pin being present on different sleeve portions, or on different flange portions. For a first interval of the diameter of the protective insert, the pin can be inserted into the slot, whereas for a second interval of the diameter of the protective insert, the pin cannot be disengaged from the slot.

According to another advantageous embodiment, there is provided a protective insert comprising second engagement means on said flange. The second engagement means comprises at least one first ridge or notch on said first flange portion. The at least one first ridge or notch is formed on the flange underside of said first flange portion.

The second engagement means further comprises at least one second ridge on said second flange portion. The at least one second ridge is formed on the flange upper side of said second flange portion.

According to a further advantageous embodiment, there is provided a protective insert comprising second engagement means on said sleeve. The second engagement means comprises at least one first ridge or notch on said first sleeve portion. The at least one first ridge or notch is formed on the sleeve outer side.

The second engagement means further comprises at least one second ridge on said second sleeve portion. The at least one second ridge is formed on the sleeve inner side.

According to one advantageous embodiment, there is provided a protective insert wherein the at least one second ridge and/or the at least one first ridge or notch is substantially v-shaped.

According to another advantageous embodiment, there is provided a protective insert wherein said slot comprises a longer section and a shorter section, whereby the longer section is narrower than the shorter section.

According to yet another advantageous embodiment there is provided a protective insert wherein said first interval comprises smaller diameters than said second interval.

According to a further advantageous embodiment, there is provided a protective insert, wherein said pin extends;
from the flange underside of said first flange portion,
or from the sleeve outer side of said first sleeve portion.

Further, said pin is substantially T-shaped and has a pin end portion extending substantially perpendicular to the extension of the pin start portion.

According to yet a further advantageous embodiment, there is provided a protective insert being made of a resilient material contributing to said diametric adjustability.

According to one advantageous embodiment, there is provided a protective insert which comprises resilient means contributing to said diametric adjustability.

According to a further advantageous embodiment, there is provided a protective insert wherein said resilient means comprises at least one expandable and compressible segment in said flange.

According to another advantageous embodiment, there is provided a protective insert wherein the resilient means comprises at least one groove in said sleeve.

According to yet another advantageous embodiment, there is provided a protective insert wherein said flange is divided in sections. The sections are connected by said resilient means. The resilient means comprises expandable and compressible segments.

According to yet a further advantageous embodiment there is provided a protective insert wherein said sleeve is divided in sections. The sections are connected by said resilient means wherein said resilient means comprises grooves.

According to one advantageous embodiment, there is provided a protective insert wherein said flange extends from said sleeve under an angle in the interval of approximately 83-95 degrees. Advantageously the angle is 85-90 degrees and most advantageously said angle is 87-90 degrees. Said angle is measured from the flange underside, towards the sleeve outer side.

When said angle is smaller than 90 degrees that brings the advantage that the protective insert can deflect inwardly a certain distance before bearing against the annular surface of a coil or roll of sheet material. The protective insert deflects inwardly resiliently while exerting a certain resistance against the force making it to deflect. This is true when the protective insert is not secured by additional package straps. When the protective insert is being additionally secured with package straps the protective insert will have a tight fit against the surfaces of the roll of sheet material if said angle is 90 degrees or smaller than 90 degrees. That the protective insert has a tight fit is an advantage e.g. because objects cannot enter any gaps between the protective insert and the roll.

According to a further advantageous embodiment, there is provided a protective insert wherein said flange comprises at least one ridge.

According to another advantageous embodiment, there is provided a protective insert wherein said flange comprises at least one ridge which extends along at least part of the flange inner circumference. There is also provided at least one ridge extending along at least part of the flange outer circumference.

According to a further advantageous embodiment, there is provided a protective insert wherein said sleeve comprises at least one ridge.

According to yet a further advantageous embodiment, there is provided a protective insert wherein said sleeve comprises at least one ridge which extends along at least part of the sleeve inner edge. The at least one ridge extends along at least part of the sleeve outer edge.

According to another aspect of the invention there is provided a method of protecting a portion of an object having a hollow core, in particular a roll of sheet material having a hollow core. Said method comprises fitting a protective insert to said object. When fitting said protective insert the following is included;

reducing the diameter of said protective insert, engaging engagement means of said protective insert, placing said protective insert so that said sleeve extends into the hollow core, adjusting the diameter of said protective insert to fit the hollow core and locking said protective insert to this diameter.

Further possible features and benefits of the present invention will be explained in the detailed description below.

BRIEF DESCRIPTION OF THE DRAWINGS

The invention will now be described by way of non-limiting embodiments with reference to the accompanying figures in which.

Throughout the figures, the same items will be referenced by the same reference numbers.

DETAILED DESCRIPTION

Before the device and method described herein is described in detail, it is to be understood that this device and method is not limited to the particular component parts of the devices described or steps of the methods described as such devices and methods may vary. It is also to be understood that the terminology used herein is for purposes of describing particular embodiments only, and is not intended to be limiting. It must be noted that, as used in the specification and the appended claims, the singular forms "a," "an" and "the" also include plural referents unless the context clearly dictates otherwise. Thus, for example, reference to "an element" includes more than one such element, and the like.

With the expression "axial displacement", a displacement substantially in the direction of axial extension of the sleeve 102 is meant.

With the expression "radial displacement", a displacement substantially in a radial direction with reference to the centre point of a circle defined by the circumference of the sleeve 102, is meant.

With the expression "circumferential displacement", a displacement substantially in the direction of the circumference of the sleeve 102 is meant.

Figure 1A:
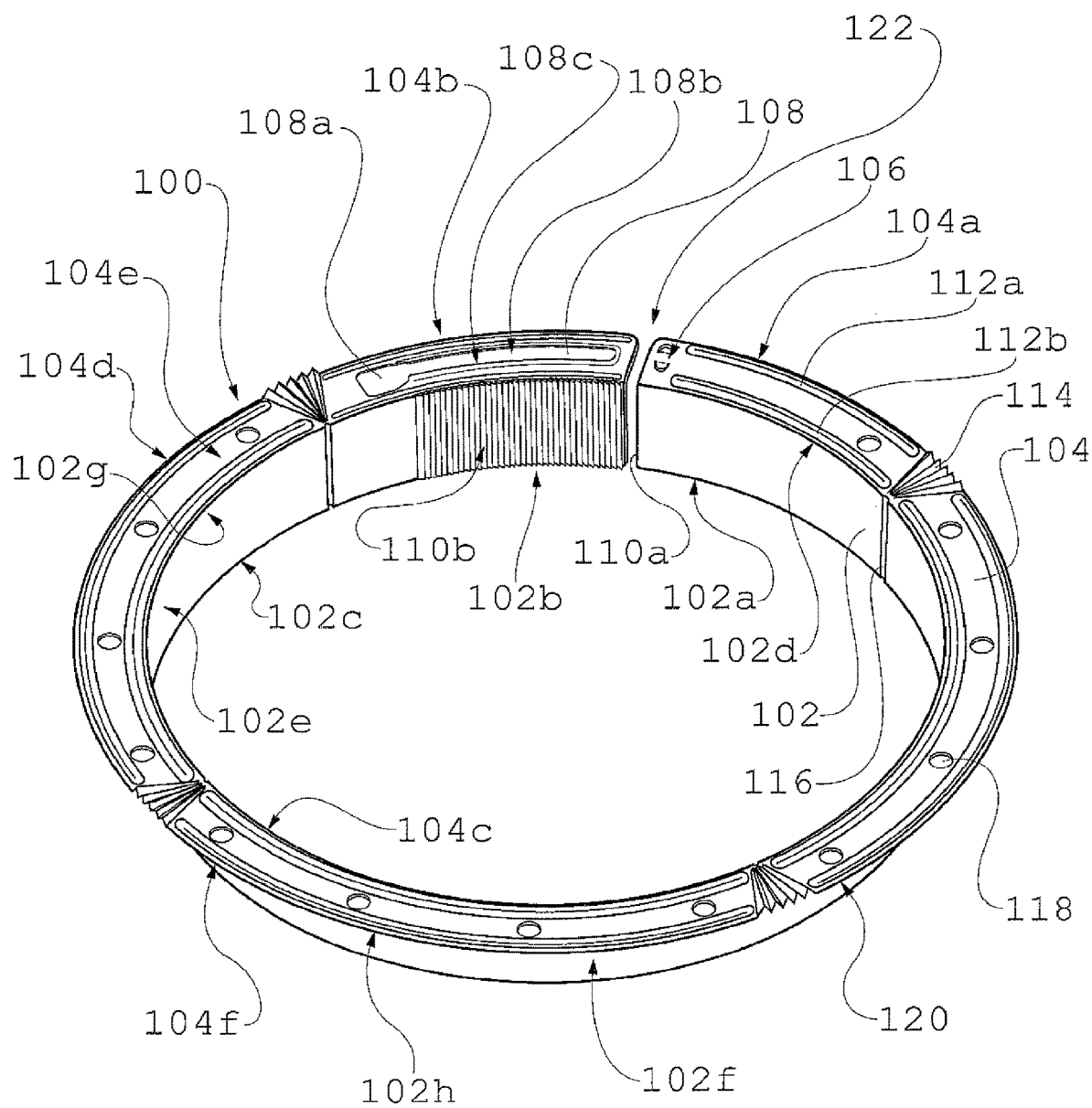
FIG. 1a is a drawing showing a first embodiment of the protective insert.

In FIG. 1a;
the sleeve inner edge is indicated at 102c,
the sleeve outer edge is indicated at 102d,
the sleeve inner side is indicated at 102e,
the sleeve outer side is indicated at 102f,
the sleeve inner circumference is indicated at 102g (also shown in FIG. 3c),
the sleeve outer circumference is indicated at 102h (also shown in FIG. 3c),
the flange inner circumference is indicated at 104c,
the flange outer circumference is indicated at 104d,
the flange upper side is indicated at 104e,
the flange underside is indicated at 104f.

Referring to FIG. 1a, an advantageous first embodiment of the protective insert 100 now will be described. The protective insert 100 is ring shaped and comprises a sleeve 102, a flange 104 and first engagement means 106, 108 comprising a pin 106 on a first flange portion 104a and a slot 108 on a second flange portion 104b. The slot 108 comprises a wider slot section 108a for insertion of the pin 106, and a narrower slot section 108b for engaging the pin 106. Advantageously, the slot 108 has a curved shape which substantially corresponds to the curvature of the flange 104. As shown in FIG. 1a, advantageously the narrower slot section 108b comprises an elevated slot edge section 108c which is elevated sufficiently to accommodate the pin end portion 106b in the space between the underside of the elevated slot edge section 108c and the underside of the flange 102. As shown in FIG. 1a, the wider slot section 108a may be asymmetric and be wider in the area close to the inner circumference of the flange 104 to further facilitate the insertion of the pin 106. In the view in FIG. 1a, the pin 106 extends on the underside of a first flange portion 104a. The first engagement means 106, 108 contributes to the diameter of the protective insert 100 being able to be adjusted.

The protective insert 100 is open, i.e. there is a distance 122 between a first sleeve portion 102a and a second sleeve portion 102b and between first and second flange portions 104a and 104b, when the protective insert 100 is not mounted or otherwise affected by external forces. Due to the engagement means the protective insert 100 can easily be brought from an open position to a closed position while permitting easy adjustment of the diameter and enabling a secure fastening towards the inner surface of a centre aperture or eye of an object, e.g. a roll of sheet steel, sheet aluminum or paper. When the protective insert 100 is in a closed position it can also easily be opened. That the protective insert 100 is open when it is not mounted contributes to the force that the protective insert 100 exerts outwards when it is mounted. That the protective insert 100 is manufactured of plastic also contributes to said force since it contributes to the protective insert 100 being resilient.

Figure 1B:
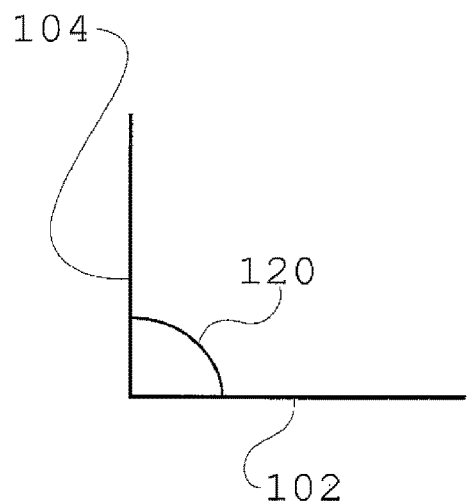
FIG. 1b is a basic detail drawing showing part of the protective insert.

The sleeve 102 and the flange 104 are arranged at an angle, called flange angle 120, of approximately 90 degrees to each other, advantageously the angle is somewhat smaller than 90 degrees. The angle is measured as shown in FIG. 1b. Said angle may be in the interval 83-95 degrees, more advantageously 85-90 degrees and most advantageously 87-90 degrees.

Figure 1C:
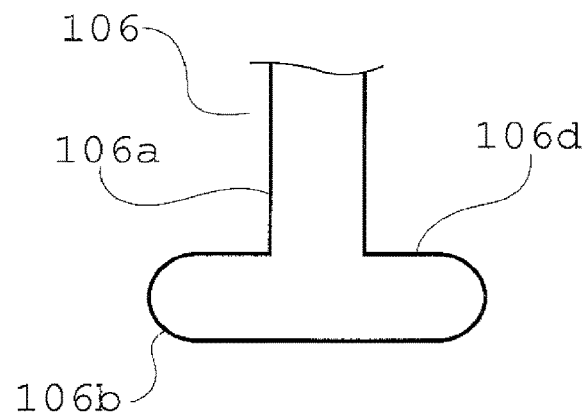
FIG. 1c is a basic detail drawing showing one embodiment of a pin 106.

The pin 106 comprises a pin start portion 106a and a pin end portion 106b and the pin end portion 106b is advantageously T-shaped as shown in FIG. 1c. The first engagement means 106, 108 secures the first and second sleeve portions 102a and 102b, or the first and second flange portions 104a, 104b, of the protective insert 100 and prevents axial and/or radial displacement, advantageously axial and radial displacement, of said portions.

The overall design of the slot 108 and pin 106 is one factor contributing to the ability of the first engagement means 106, 108 to prevent displacement.

Advantageously there is a tight fit between pin 106 and slot 108 and between the upper surface 106d of the pin end portion 106b and the surface on the underside of the elevated slot edge section 108c of the slot 108, when pin 106 and slot 108 are engaged. This is also one factor contributing to the ability of the first engagement means 106, 108 to prevent displacement.

Advantageously, there is a precise dimensioning of the width of the pin start portion 106a in relation to the width of the narrower second slot section 108b, whereby the width of the pin start portion 106a is substantially equal to the width of the narrower second slot section 108b. However, the width of the pin start portion 106a is not exactly equal to the width of the narrower second slot section 108b since this would make it difficult to slide or move the pin 106 in the narrower second slot section 108b.

Advantageously, the width of the pin start portion 106a is slightly smaller than the width of the narrower second slot section 108b to facilitate movement of the pin 106. The above mentioned in this paragraph is one factor contributing to the ability of the first engagement means 106, 108 to prevent radial displacement between the adjacent sleeve portions 102a, 102b and/or the adjacent flange portions 104a, 104b.

Advantageously, there is a precise dimensioning of the length of the pin start portion 106a, so that the upper surface 106c of the pin end portion 106b, is in contact with the surface on the underside of the elevated slot edge section 108c surrounding slot 108, when pin 106 and slot 108 are engaged. This is one factor contributing to the ability of the first engagement means 106, 108 to prevent axial displacement between the adjacent sleeve portions 102a, 102b and/or the adjacent flange portions 104a, 104b.

Advantageously, there may be provided second engagement means 110 in the form of a snap and ratchet mechanism comprising at least one first ridge or notch 110a and at least one, advantageously several, second ridges 110b. The second engagement means 110 enables the adjustment of the diameter of the protective insert 100 to a desired diameter and to lock the protective insert 100 in that diameter. In the embodiment illustrated in FIG. 1a, several second ridges 110b are provided on a part of the inner surface of the second sleeve portion 102b and extend radially. The second ridges 110b cover an area extending circumferentially substantially from the edge of the second sleeve portion 102b. One or more first ridges or notches 110a are provided on a part of the outer surface of the first sleeve portion 102a and extends radially. If there are more than one first ridge or notch 110a, they cover an area extending circumferentially substantially from the edge of the first sleeve portion 102a. If more than one first ridge or notch 110a is provided the securing action of the second engagement means 110 may be increased. I FIG. 1a the first ridges or notches 110a are not visible but in FIG. 3c one first ridge or notch 110a is shown.

Second ridges 110b and first ridges or notches 110a may have substantially the same shape. But the at least one first ridge or notch 110a basically may have any shape as long as it can engage in locking interaction with the second ridges 110b.

Figure 1D:
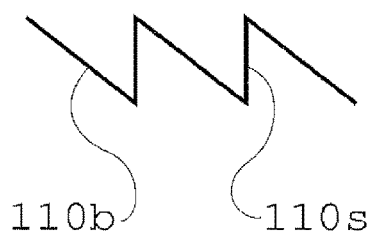
FIGS. 1d and 1e are basic drawings showing a detail of one part of the protective insert.
Figure 1E:
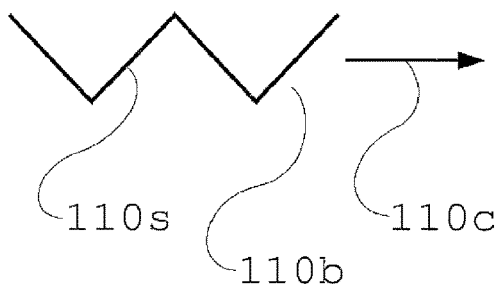

In FIGS. 1d and 1e two examples of different shapes of the second ridges 110b are shown, the surfaces 110s may e.g. have different inclinations. If the surfaces 110s are inclined as in FIG. 1d the ability of the second engagement means 110 to prevent circumferential displacement in the direction opposite of the arrow 110c is increased, as compared to the shape shown in FIG. 1e. The arrow points towards the edge of the second sleeve portion 102b. On the other hand, a symmetrical shape of the ridges, as shown in FIG. 1e, provides equally good prevention of circumferential displacement in both directions, the direction of the arrow and the opposite direction.

The resilient properties of the protective insert 100, contributes to the presence of a snap action when the respective ridges 110a and 110b engage. The second engagement means 110 mainly prevents circumferential displacement between the first and second sleeve portions 102a and 102b and/or the first and second flange portions 104a and 104b.

Both the first engagement means 106, 108 and the second engagement means 110 contribute to the advantageous handing and mounting properties of the protective insert 100. The protective insert 100 is easily mounted in openings having, within a reasonable interval, different inner diameters and sits securely when mounted. The protective insert 100 may be provided with both first engagement means 106, 108 and second engagement means 110 or one of these engaging means.

Providing the protective insert 100 with both first and second engaging means results in a synergistic effect and provides a stable connection of the adjacent sleeve and flange portions in axial, circumferential, and advantageously also radial, direction of the protective insert 100, and ensures that the protective insert 100 exerts a certain force against the inner surface 404 of the hollow core in which it is mounted. One synergistic effect is e.g. that the securing action of the second engagement means 110 is enhanced by the locking action of the first engagement means 106, 108. Because the first engagement means 106, 108 prevents axial displacement, of the adjacent portions, the ridges 110a and 110b of the second engagement means 110 stay substantially parallel to each other and substantially the entire surfaces of the respective ridges 110a and 110b are in contact with each other.

Advantageously, the first engagement means 106, 108 also prevents radial displacement which prevents the respective ridges 110a and 110b from displacement in the radial direction and keeps them in close contact so they can efficiently prevent circumferential displacement of the sleeve and flange portions.

The flange 104 may extend outwards from the sleeve inner circumference 102g, from the sleeve outer circumference 102h, or from any point there between. The difference or distance between the sleeve inner circumference 102g and the sleeve outer circumference 102h depends on the material thickness of the sleeve 102.

The flange 104 and/or the sleeve 102 may be provided with one or more ridges 112a, 112b. These ridges contribute to the ability of the protective insert 100 to protect the annular side surface 402, the inner surface 404 of the hollow core and the edge 406 of e.g. a roll of sheet steel. The ridges 112 may extend in a circumferential direction as shown in FIG. 1, or in a radial direction (not shown). The embodiment with ridges on the sleeve 102 is not illustrated. The ridges 112 can deflect inwardly under pressure, and thus can act as buffers to increase the ability of the protective insert 100 to withstand impact and prevent damage to e.g. a roll of sheet material, e.g. steel, aluminum or paper.

Figure 4A:
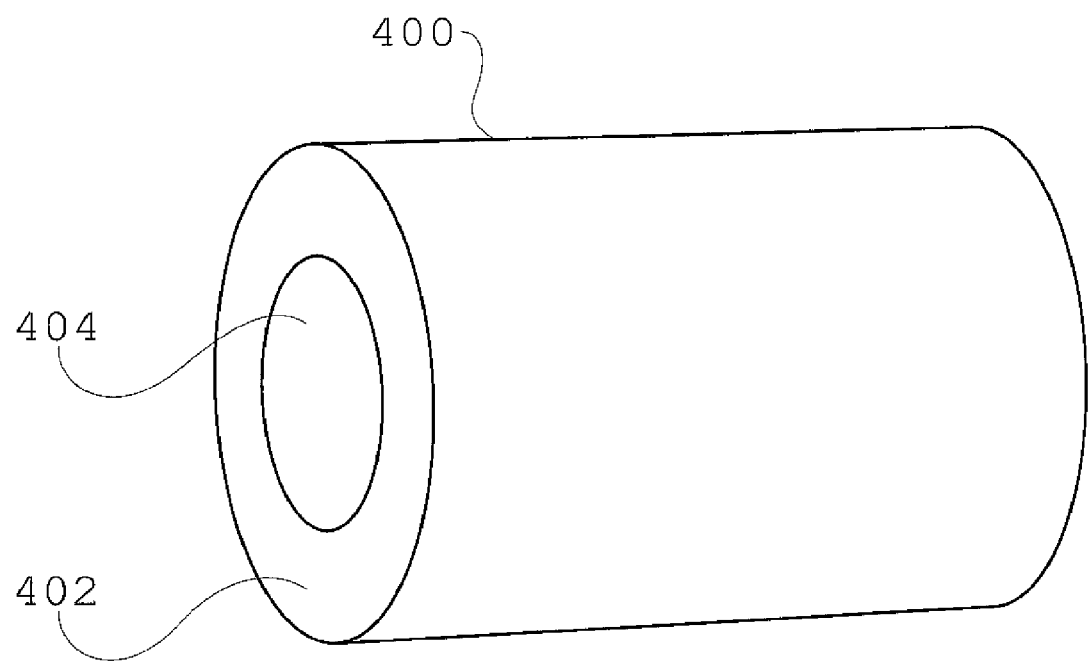
FIGS. 4a-4b are basic drawings showing a roll of sheet steel and how the protective insert may be mounted to it, the protective insert shown without details.
Figure 4B:
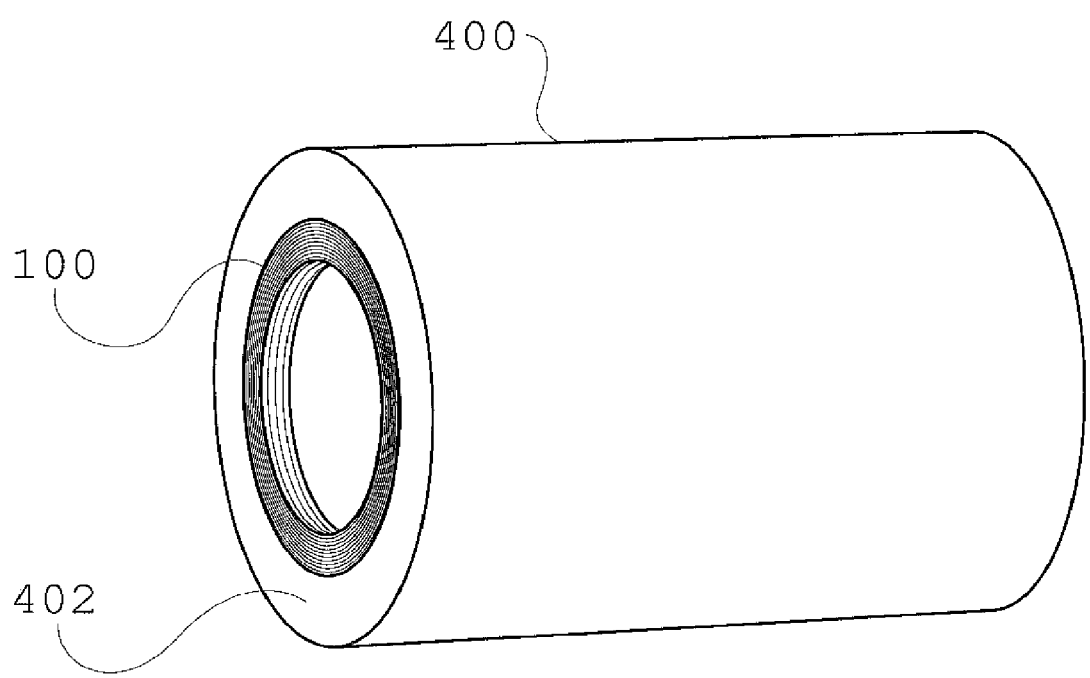

FIG. 4a show a roll 400 of sheet material. FIG. 4b show how a protective insert 100 is mounted in the eye or centre aperture 408 of the roll 400. The surfaces 402, 404 and the edge 406 of a roll 400 of sheet material, e.g. steel, aluminum or paper, are susceptible of being damaged when the roll is transported and handled. Often these rolls are lifted with an arm that is inserted into the hollow core of the roll and then there is a risk that both the annular side surface 402, the inner surface 404 of the hollow core, and the edge 406 get damaged. The protective insert 100 protects these surfaces and the edge 406 from being damaged. !fridges 1 12a, 112b are provided on the flange 104 and/or on the sleeve 102 they additionally contribute to protect the mentioned surfaces and also the edge 406 from being damaged. The ridges 112a, 112b which may be provided on the flange 104 may be high enough to accommodate the height of the pin 106. In that way the annular side portion of e.g. a roll of sheet steel is not damaged by the pin 106 even if the elevated edge slot section 108c of the slot 108 would not be elevated, or if the pin 106 would protrude farther than the height of the elevated edge slot section 108c.

When the protective insert 100 is not mounted, the outer diameter of the sleeve 102 is advantageously greater than the inner diameter of the centre aperture or eye 408 in which it is to be mounted. If e.g. the protective insert 100 is to be mounted in the eye of a roll of sheet steel or aluminum which has a nominal diameter of 610 mm it is advantageous if the outer diameter of the sleeve 102 is approximately 620 mm when not mounted. In this way the protective insert 100 will sit securely in the eye or centre aperture also if the inner diameter is somewhat greater than the nominal 610 mm.

The protective insert 100 may advantageously be used without additional securing measures but when necessary the protective insert 100 may also be additionally secured with package straps which may be pulled through the centre aperture and extending on the outside of the roll. A package strap is schematically shown at 410 in FIG. 4b.

The flange 104 may be divided in sections where the sections are connected by expandable and compressible segments 114. The segments 114 contribute to the ability of the protective insert 100 of being adjusted to different diameters, facilitates the mounting of the protective insert 100 and contributes to the resiliency of the protective insert 100. The segments 114 may e.g. comprise a creased structure where in addition the thickness of the material may be smaller than in the rest of the flange 104. In FIG. 1a the segments 114 are wedge shaped which is advantageous when the diameter of the protective insert 100 needs to be adjusted, e.g. when mounting the protective insert 100. Wedge shaped segments 114 contribute to the resiliency of the protective insert 100 and to the secure fastening of the protective insert 100 when it is mounted. But the segments 114 may also have other shapes, e.g. square.

The sleeve 102 may also be divided in sections where the sections are connected by connecting sleeve areas 116 having smaller thickness, e.g. in the form of grooves, which functions like hinges between the different sections of the sleeve 102. The areas or grooves 116 contribute to the ability of the protective insert 100 of being adjusted to different diameters and facilitates the mounting of the protective insert 100.

In FIG. 1 there are four segments 114 and connecting sleeve areas 116 which are circumferentially equally spaced.

The flange 104 may be provided with holes or cut outs 118, which are few enough not to reduce the strength of the flange 104 but they lower the weight of the protective insert 100 which facilitates handling and mounting and they save material and thereby make the protective insert 100 more economical to produce. The first engagement means 106, 108 may be provided on the first and second flange portions 104a and 104b as in the embodiment illustrated in FIG. 1a or on the first and second sleeve portions 102a and 102b as in the embodiment illustrated in FIG. 2.

Figure 2:
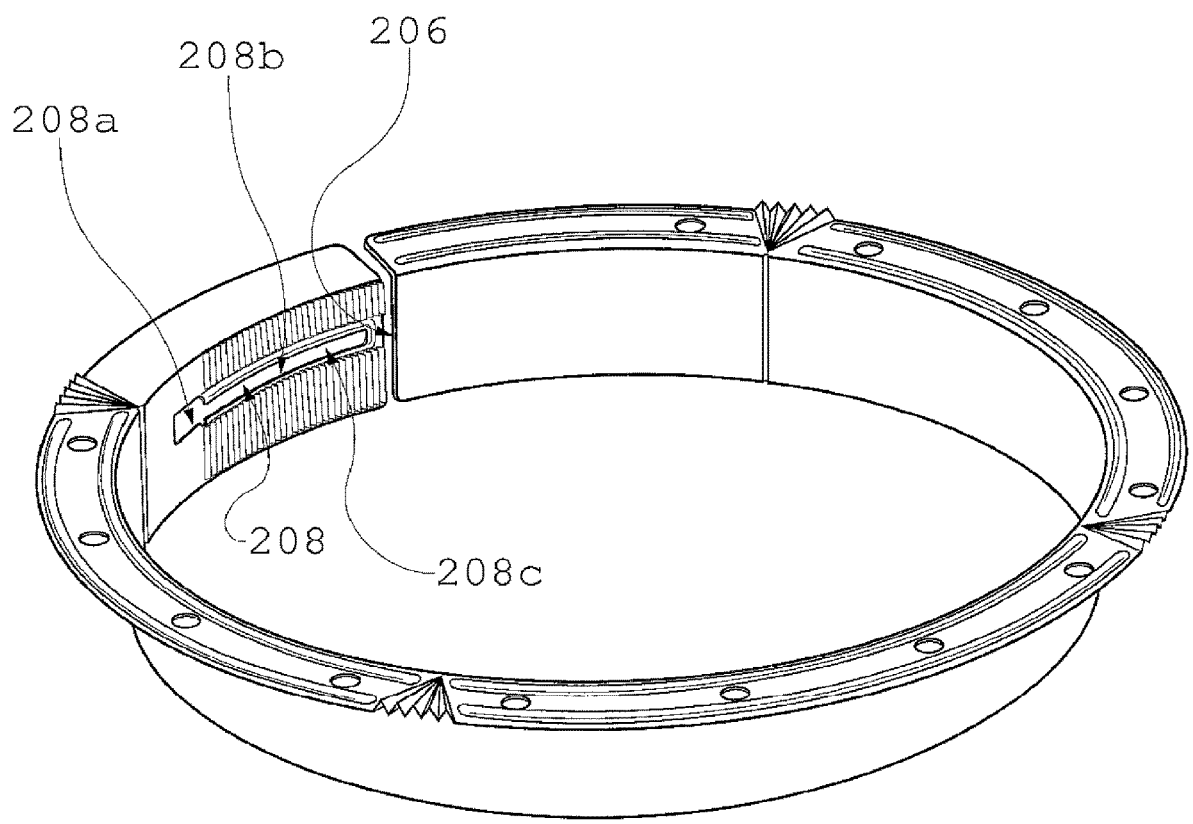
FIG. 2 is a drawing showing a second embodiment of the protective insert.

The second engagement means 110 may be provided on the first and second sleeve portions 102a and 102b as in the embodiments illustrated in FIGS. 1a and 2, or on the first and second flange portions 104a and 104b (not illustrated).

In FIG. 2 it is shown a second embodiment of the protective insert 100. It is illustrated that the first engagement means may be provided on the sleeve 102. A slot 208 is provided on the second sleeve portion 102b. The slot 208 has a wider slot section 208a for insertion of the pin 206, and a narrower slot section 208b for engaging the pin 206. The slot 208 may have a protruding edge 208c as shown and as the slot 108. A pin 206 (not shown) extends from the sleeve outer side 102f When the pin 206 is engaged with the slot 208 the pin end portion 206a does not extend beyond the sleeve outer side 102f of the second sleeve portion 102b.

Apart from the specific design of the wider slot section 108a, the shape/curvature of the slot 108 and that the slot 108 and the pin 106 is located at/on the flange 104, the information stated about the embodiment illustrated in FIG. 1a is valid also for the embodiment illustrated in FIG. 2. However, since the pin 206 is located on the sleeve 102 in the second embodiment, there is a risk that a lifting arm, lifting a roll of sheet material on/in which the protective insert 100 is mounted, will push so hard against the pin 206 so that the pin 206 damages the inner surface of the eye or centre aperture of the roll. This risk of course only exists if the protective insert 100 is placed so that the pin 206 is located between the surface of the lifting arm and the inner surface of the eye or centre aperture of the roll.

This risk does not exist with the first embodiment of the protective insert 100, which is an advantage of the first embodiment of the protective insert 100. The first embodiment of the protective insert 100 may also be easier to mount since the first engagement means 106, 108 is easily accessible and operable on the outside/flange 104 of the protective insert 100.

Figure 3A:
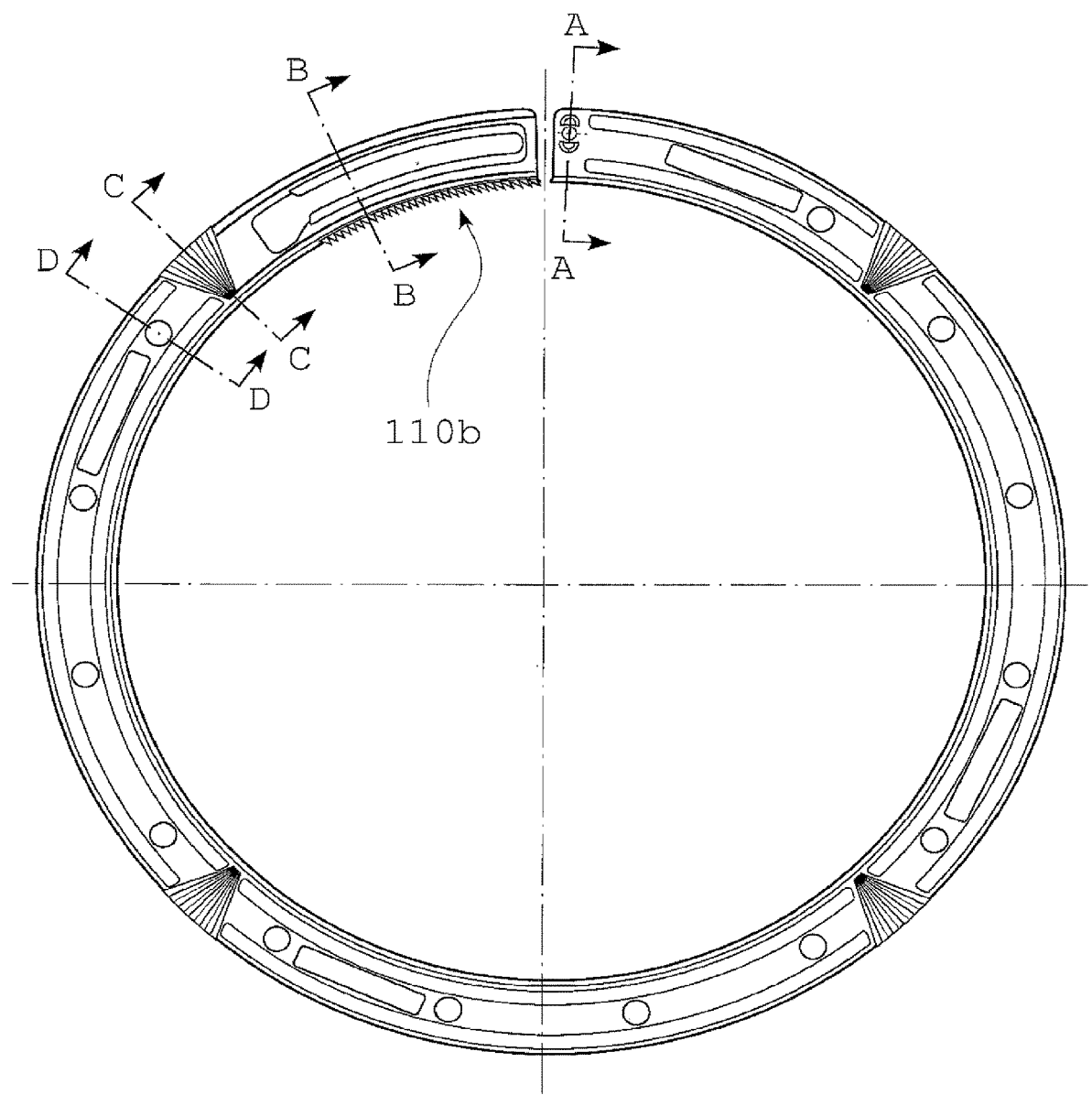
FIGS. 3a-3g are drawings showing a version of the protective insert according to the first embodiment.
Figure 3B:
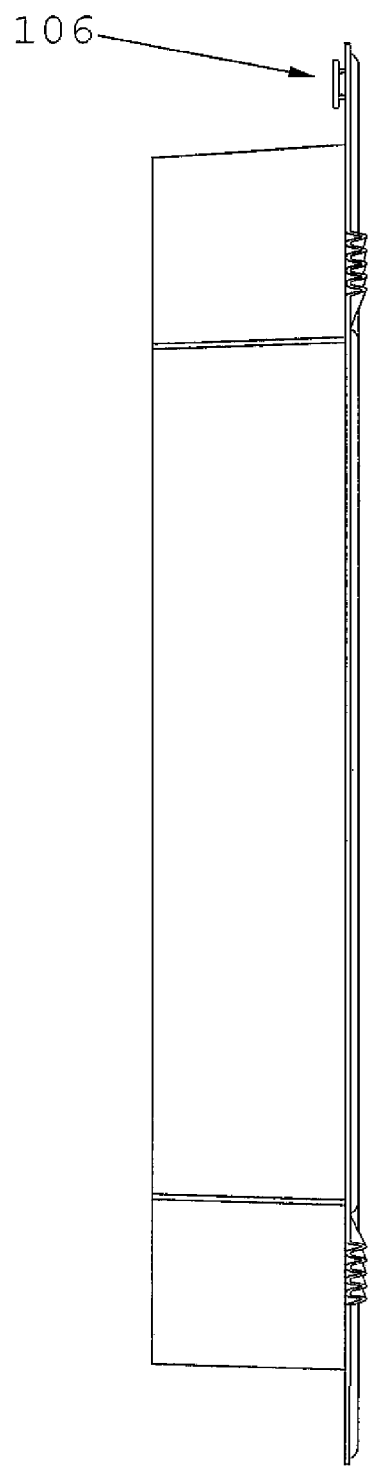
Figure 3C:
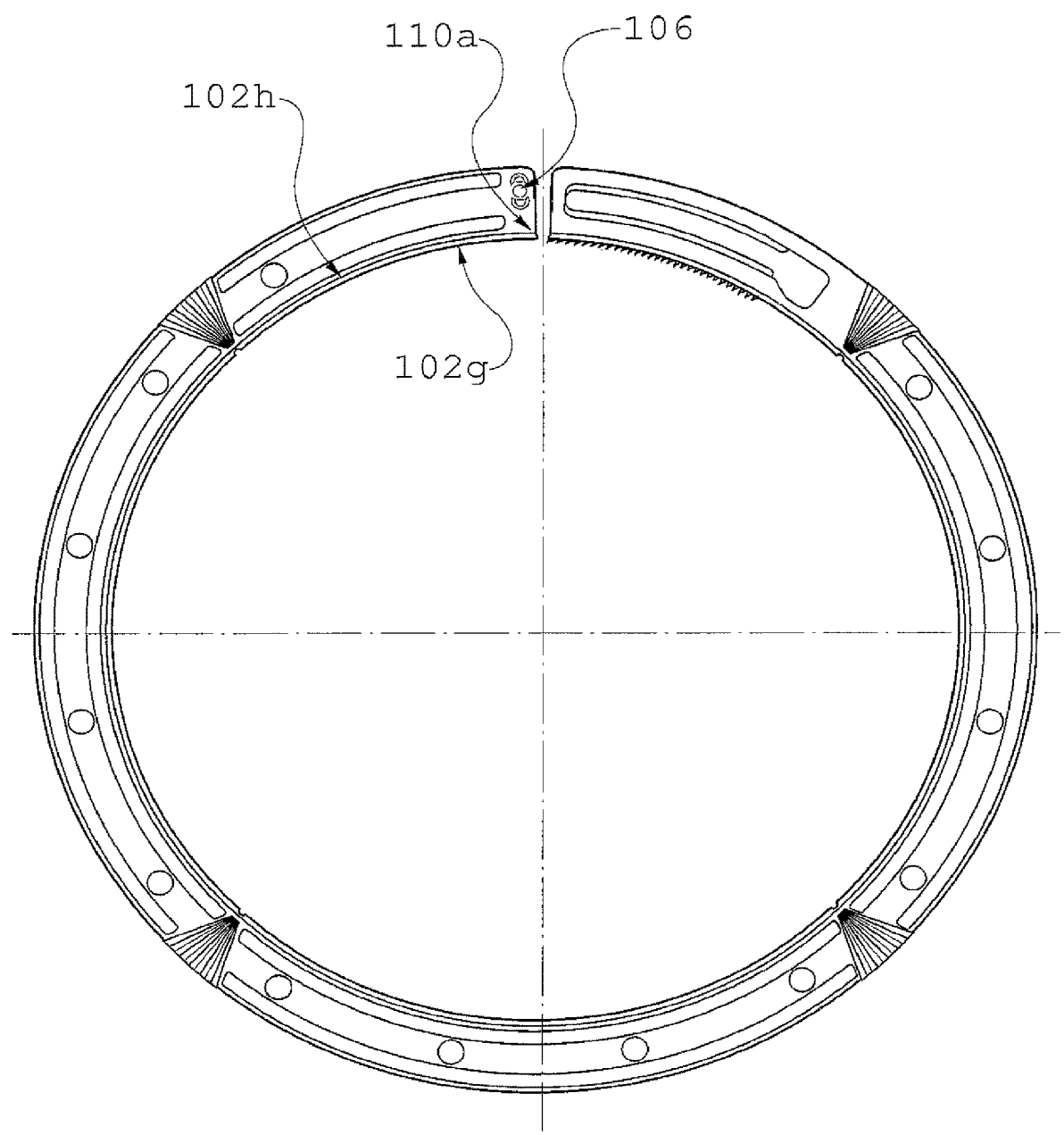
Figure 3D:
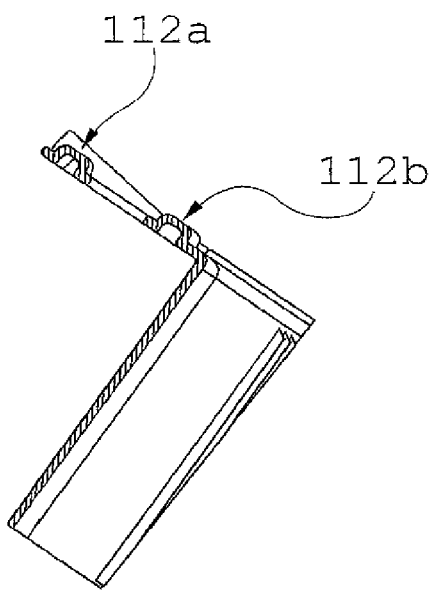

In FIGS. 3a-3c respectively a front view, side view and back view of a version of the protective insert 100 according to the first embodiment are shown. In FIGS. 3d-3g detail drawings of this version of the protective insert 100 are shown. The elements shown in the FIGS. 3d-3g are applicable to any embodiment of the protective insert 100. The measures shown in FIGS. 3d, 3f and 3g are exemplary. In FIG. 3b one embodiment of the pin 106 is shown, in FIG. 3c one embodiment of the ridge or notch 110a is shown.

FIG. 3d is a drawing according to section D-D in FIG. 3a and shows one embodiment of the ridges 112a and 112b.

Figure 3E:
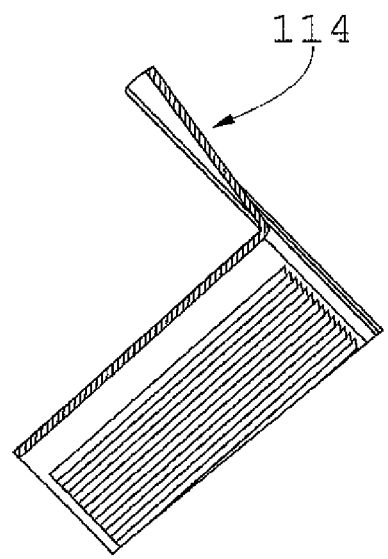
Figure 3F:
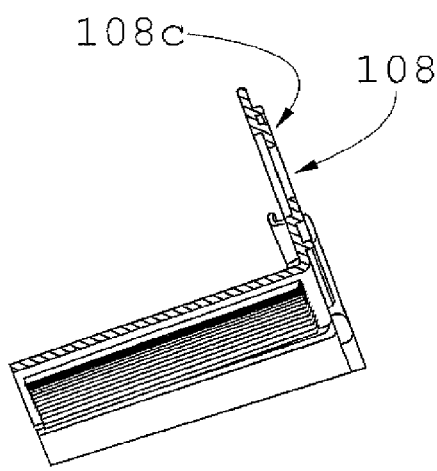
Figure 3G:
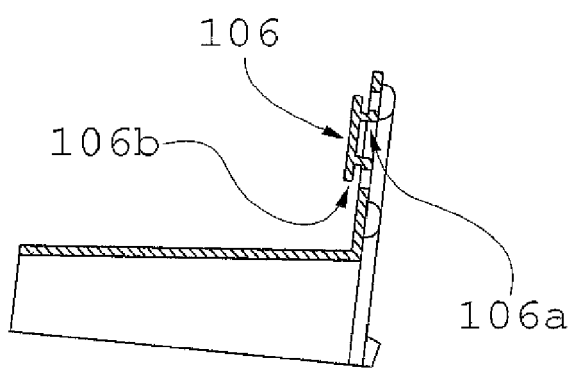

FIG. 3e is a drawing according to section C-C in FIG. 3a and shows one embodiment of the collapsible and expandable segments 114.

FIG. 3f is a drawing according to section B-B in FIG. 3a and shows one embodiment of the slot 108 with the elevated slot section 108c.

FIG. 3g is a drawing according to section A-A in FIG. 3a and shows one embodiment of the pin 106 with the pin start portion 106a and pin end portion 106b.

There are different materials suitable for the protective insert 100, advantageously plastic is used. By manufacturing the protective insert 100 in plastic the protective insert 100 can be made light, which makes it easy to handle and to mount. By being made of plastic there is a low risk, basically no risk, that the protective insert 100 should damage the coil or roll or the person mounting the protective insert 100. Some examples of suitable materials are polypropylene (PP) and polyethylene (PE) e.g. High Density Polyethylene (HDPE).

The protective insert 100 may e.g. be manufactured by injection moulding.

The protective insert 100 is advantageously used for protecting rolls of sheet steel respectively sheet aluminum and is structurally and dimensionally adapted to these fields of use.

Although particular embodiments have been disclosed herein in detail, this has been done by way of example for purposes of illustration only, and is not intended to be limiting with respect to the scope of the appended claims that follow. In particular, it is contemplated by the inventor that various substitutions, alterations, and modifications may be made to the invention without departing from the spirit and scope of the invention as defined by the claims.

What is claimed is:

1. A protective insert, for protecting a portion of an object having a hollow core, said protective insert comprising a sleeve and a flange, said flange extending radially outwards from the circumference of said sleeve, said protective insert having engagement means and being diametrically adjustable, said sleeve and said flange being open, wherein;
   a first flange portion and a second flange portion, or
   a first sleeve portion and a second sleeve portion comprise first engagement means for adjustably engaging;
   said first flange portion and said second flange portion, or said first sleeve portion and said second sleeve portion, characterised in that,
   said first engagement means comprises a slot and a pin, said slot and said pin being present on different sleeve portions, or on different flange portions, the protective insert further comprising a second engagement means, comprising at least one first ridge or notch and at least one second ridge;
   wherein the slot has a curved shape that substantially corresponds to a curvature of the flange or a curvature of the circumference of the sleeve and the pin is slidably movable within the slot when adjustably engaging said first flange portion and said second flange portion or said first sleeve portion and said second sleeve portion;
   wherein the pin has a central axis that is substantially perpendicular to the slot;
   wherein the first engagement means prevents radial displacement which prevents the at least one first ridge or notch and the at least one second ridge of the second engagement means from displacement in the radial direction, and keeps them in close contact so that they prevent circumferential displacement of the sleeve and flange portions.

2. A protective insert according to claim 1, wherein for a first interval of the diameter of the protective insert, the pin can be inserted into the slot, whereas for a second interval of the diameter of the protective insert, the pin cannot be disengaged from the slot.

3. A protective insert according to claim 1, wherein said at least one first ridge or notch are formed on the flange under side of said first flange portion,
   and said at least one second ridge are formed on the flange upper side of said second flange portion.

4. A protective insert according to claim 1, wherein said at least one first ridge or notch, are formed on the outer side on said first sleeve portion, and
   said at least one second ridge are formed on the inner side on said second sleeve portion.

5. A protective insert according to claim 1, wherein the at least one second ridge and/or the at least one first ridge or notch is substantially v-shaped.

6. A protective insert according to claim 1, wherein said slot comprises a longer section and a shorter section, whereby the longer section is narrower than the shorter section.

7. A protective insert according to claim 1, wherein said first interval comprises smaller diameters than said second interval.

8. A protective insert according to claim 1, wherein said pin extends;
   from the flange under side of said first flange portion,
   or from the sleeve outer side of said first sleeve portion,
   and whereon said pin is substantially T-shaped, said pin having a pin end portion extending substantially perpendicular to the extension of the pin start portion.

9. A protective insert according to claim 1, being made of a resilient material contributing to said diametric adjustability.

10. A protective insert according to claim 1, comprising resilient means contributing to said diametric adjustability.

11. A protective insert according to claim 10, said resilient means comprising at least one expandable and compressible segment in said flange.

12. A protective insert according to claim 10, said resilient means comprising at least one groove in said sleeve.

13. A protective insert according to claim 10, said flange being divided in sections being connected by said resilient means, said resilient means comprising expandable and compressible segments.

14. A protective insert according to claim 10, said sleeve being divided in sections being connected by said resilient means, said resilient means comprising grooves.

15. A protective insert according to claim 1, wherein said flange extends from said sleeve under an angle in the interval of 85-97 degrees, advantageously 88-95 degrees and most advantageously 90-93 degrees, said angle being measured from the flange under side, towards the sleeve outer side.

16. A protective insert according to claim 1, wherein said flange comprises at least one ridge.

17. A protective insert according to claim 1, wherein said flange comprises at least one ridge extending along at least part of the flange inner circumference, and at least one ridge extending along at least part of the flange outer circumference.

18. A protective insert according to claim 1, wherein said sleeve comprises at least one ridge extending along at least part of the sleeve inner edge, and at least one ridge extending along at least part of the sleeve outer edge.

19. A protective insert according to claim 1, wherein the pin further includes:
   a pin start portion: and
   a pin end portion where the pin end portion is wider than the pin start portion; and
   the slot further includes:
   a wider first slot section,
   a narrower second slot section adjacent the wider first slot section,
   an elevated slot edge section with an underside where the elevated edge section surrounds the narrower second slot section;
   wherein an upper surface of the pin end portion is in contact with the underside of the elevated edge section.

20. A protective insert, for protecting a portion of an object having a hollow core, said protective insert comprising a sleeve and a flange, said flange extending radially outwards from the circumference of said sleeve, said protective insert having engagement means and being diametrically adjustable, said sleeve and said flange being open, wherein;
   a first flange portion and a second flange portion, or
   a first sleeve portion and a second sleeve portion comprise first engagement means for adjustably engaging;
   said first flange portion and said second flange portion, or said first sleeve portion and said second sleeve portion, characterised in that,
   said first engagement means comprises a slot and a pin, said slot and said pin being present on different sleeve portions, or on different flange portions, the protective insert further comprising a second engagement means, comprising at least one first ridge or notch and at least one second ridge;
   wherein the first engagement means prevents radial displacement which prevents the at least one first ridge or notch and the at least one second ridge of the second engagement means from displacement in the radial direction, and keeps them in close contact so that they prevent circumferential displacement of the sleeve and flange portions.

* * * * *